United States Patent
Sivakumar et al.

(10) Patent No.: US 11,861,313 B2
(45) Date of Patent: Jan. 2, 2024

(54) MULTI-LEVEL LINGUISTIC ALIGNMENT IN SPECIFIC USER TARGETED MESSAGING

(71) Applicant: International Business Machines Corporation, Armonk, NY (US)

(72) Inventors: Gandhi Sivakumar, Bentleigh (AU); Lynn Kwok, Southbank (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 16/779,663

(22) Filed: Feb. 2, 2020

(65) Prior Publication Data
US 2021/0240936 A1  Aug. 5, 2021

(51) Int. Cl.
| | | |
|---|---|---|
| *G06F 40/30* | (2020.01) | |
| *G06F 40/253* | (2020.01) | |
| *G06F 40/263* | (2020.01) | |
| *G06N 5/04* | (2023.01) | |

(52) U.S. Cl.
CPC ............ *G06F 40/30* (2020.01); *G06F 40/253* (2020.01); *G06F 40/263* (2020.01); *G06N 5/04* (2013.01)

(58) Field of Classification Search
CPC .... G06F 40/253; G06F 40/232; G06F 40/263; G06F 9/451; G06F 40/30; G06F 40/47; G06F 40/56; G06F 40/58; G06F 40/174; G06F 40/205; G06N 3/0445; G06N 3/08; G06N 5/04; G10L 15/063; G10L 15/02; G10L 15/22; G10L 15/26
See application file for complete search history.

(56) References Cited

U.S. PATENT DOCUMENTS

| | | | |
|---|---|---|---|
| 8,942,974 B1* | 1/2015 | Leblang | G06F 40/263 |
| | | | 704/270.1 |
| 8,983,827 B2* | 3/2015 | Iantosca | G06F 40/253 |
| | | | 704/10 |
| 9,268,769 B1* | 2/2016 | Shalit | G06Q 30/0242 |
| 9,648,581 B1* | 5/2017 | Vaynblat | H04L 67/535 |
| 9,971,769 B2* | 5/2018 | Shin | G06F 40/30 |
| 10,095,688 B1* | 10/2018 | Schilling | G06F 11/3438 |

(Continued)

OTHER PUBLICATIONS

Merriam-Webster.com, Definition of slang, 2021, Merriam-Webster, Incorporated, pp. 1-3 (Year: 2021).*

(Continued)

*Primary Examiner* — Daniel C Washburn
*Assistant Examiner* — Paul J. Mueller
(74) *Attorney, Agent, or Firm* — Michele Liu Baillie; Lily Neff

(57) ABSTRACT

A computer implemented method, system and program product is provided for linguistic alignment in specific user targeted messaging. In one embodiment, new and previously existing data about a specific user is analyzed and personality insights are determined. Location of the user is also determined. Using this location and collected data and personality insights, a multilayered set of linguistic preferences is determined for the specific user. This set is used to customize a message for the specific user based on the linguistic set and ultimately a message is sent to the specific user using a selected messaging channel.

20 Claims, 6 Drawing Sheets

(56) References Cited

U.S. PATENT DOCUMENTS

| | | | | |
|---|---|---|---|---|
| 10,171,403 | B2* | 1/2019 | Ashoori | H04L 63/04 |
| 10,311,858 | B1* | 6/2019 | Mont-Reynaud | G06F 40/211 |
| 10,817,787 | B1* | 10/2020 | Zhang | G06N 5/046 |
| 11,049,604 | B2* | 6/2021 | Chakra | G16H 10/60 |
| 2006/0242013 | A1* | 10/2006 | Agarwal | G06Q 30/0273 705/14.69 |
| 2008/0082410 | A1* | 4/2008 | Zhou | G06Q 30/0255 705/14.66 |
| 2008/0175507 | A1 | 7/2008 | Lookingbill et al. | |
| 2009/0177460 | A1* | 7/2009 | Huang | G06F 40/45 704/2 |
| 2010/0169091 | A1* | 7/2010 | Zurek | G06Q 30/02 704/235 |
| 2010/0306054 | A1 | 12/2010 | Drake et al. | |
| 2012/0017146 | A1* | 1/2012 | Travieso | G06F 16/9537 715/265 |
| 2012/0179642 | A1* | 7/2012 | Sweeney | G06F 16/3334 706/55 |
| 2013/0317808 | A1* | 11/2013 | Kruel | H04L 51/52 704/9 |
| 2013/0346064 | A1* | 12/2013 | Chen | G06F 40/263 704/8 |
| 2016/0171560 | A1* | 6/2016 | Roy | H04L 51/063 705/14.67 |
| 2016/0224540 | A1* | 8/2016 | Stewart | G06F 40/263 |
| 2017/0147561 | A1* | 5/2017 | Bangalore | G06Q 30/0241 |
| 2018/0046938 | A1 | 2/2018 | Allen et al. | |
| 2018/0075775 | A1* | 3/2018 | Conway | G09B 5/12 |
| 2018/0095949 | A1* | 4/2018 | Lewis | G06F 16/22 |
| 2018/0157990 | A1 | 6/2018 | Allen et al. | |
| 2018/0315094 | A1* | 11/2018 | Ashoori | G06Q 30/0269 |
| 2019/0005548 | A1* | 1/2019 | Peppel | G06V 30/153 |
| 2019/0065458 | A1* | 2/2019 | Brunet | G06Q 50/01 |
| 2019/0073693 | A1* | 3/2019 | Moukaddem | G06F 40/131 |
| 2019/0114322 | A1* | 4/2019 | Huang | G06F 40/268 |
| 2019/0121856 | A1* | 4/2019 | Terry | G06F 40/30 |
| 2019/0129933 | A1* | 5/2019 | Terry | G06F 40/169 |
| 2019/0236148 | A1* | 8/2019 | DeFelice | G06N 3/0472 |
| 2019/0244600 | A1 | 8/2019 | Huang et al. | |
| 2020/0387924 | A1* | 12/2020 | Patel | G06N 5/043 |
| 2021/0240936 | A1* | 8/2021 | Sivakumar | G06F 40/56 |
| 2021/0241315 | A1* | 8/2021 | Clark | G06Q 30/0254 |

OTHER PUBLICATIONS

"AI Platform for Business—IBM Research AI—Home", https://www.research.ibm.com/artificial-intelligence/ai-platform-for-business/, retrieved Jan. 16, 2020.

Conseil, Nina, "A Segment of One: The Next Generation of Customer Engagement", https://digitalmarketingmagazine.co.uk/customer-experience/a-segment-of-one-the-next-generation-of-customer-engagement/4709, Nov. 8, 2017.

Leyva, Michael, "Creating a Segment of One", https://www.capgemini.com/2018/06/creating-a-segment-of-one/#, Jun. 20, 2018.

Wheeler, Karen, "How a 'segment of one' approach can help businesses connect with their customers—Fourth Source", https://www.fourthsource.com/general/how-a-segment-of-one-approach-can-help-businesses-connect-with-their-customers-23392, Nov. 27, 2018.

* cited by examiner

MULTI-LEVEL LINGUISTIC ALIGNMENT IN SPECIFIC USER TARGETED MESSAGING

BACKGROUND

Data analytics can be leveraged to customize and target an individual user in a messaging campaign, known as "segment of one" messaging. Data concerning interactions of an individual user across multiple platforms is aggregated and analyzed to understand the individual user's behavior, preferences, and expectations. Using the results of the analysis, messaging to the individual user can then be customized to specifically target the user. With the increasing availability of data, such analysis for segment of one messaging can be improved to incorporate more in-depth understanding of the individual user.

SUMMARY

Disclosed herein is a method for linguistic alignment in specific user targeted messaging, and a computer program product and system as specified in the independent claims. Embodiments of the present invention can be freely combined with each other if they are not mutually exclusive.

According to an embodiment of the present invention, a method includes: calculating, by a computer system, a linguistics preference set for a specific user using cognitive models with specific user data as input; selecting, by the computer system, a messaging channel according to the linguistics preference set, the linguistics preference set including one or more sets of linguistic traits preferred by the specific user; determining, by the computer system, a location of the specific user; determining, by the computer system, a set of linguistic traits applicable to a customized message based on the linguistics preference set for the specific user and the location of the specific user; generating, by the computer system, the customized message to incorporate the set of linguistic traits; and sending, by the computer system, the customized message only to the specific user over the selected messaging channel.

DETAILED DESCRIPTION

Embodiments of the present invention calculates, using cognitive models, personal insights and situational insights for a specific user through analyzing data concerning interactions of the individual user across a plurality of platforms. Cognitive models are used to process and analyze the specific user data, where the cognitive models include computerized models that simulate or predict human behavior or performance based on similar tasks and/or human interactions. Using the personal and situational insights as parameters of the cognitive models, a linguistics preference set for the specific user is calculated. A message customized to the specific user is generated according to the linguistics preference set, which provides a multi-level linguistic alignment between the individual user and the linguistics used in the message.

Figure 1:
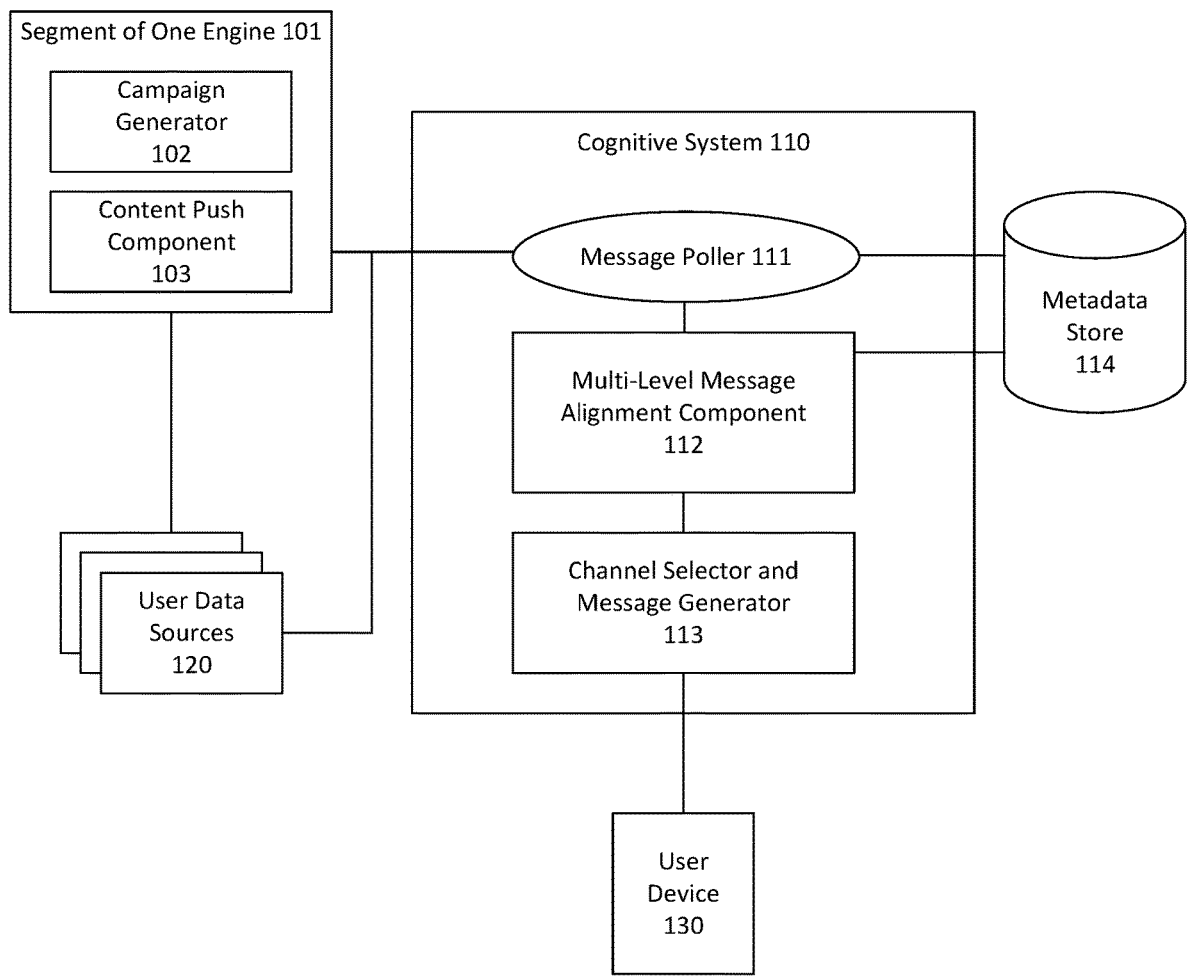
FIG. 1 illustrates a computing environment for multi-level linguistic alignment in specific user targeted messaging, according to embodiments of the present invention.

FIG. 1 illustrates a computing environment for multi-level linguistic alignment in specific user targeted messaging, according to embodiments of the present invention. The computing environment is implemented by one or more computer systems, as described below with reference to FIG. 5. The computing environment includes a segment of one engine 101 for managing messaging campaigns. The segment of one engine 101 includes a campaign generator 102 for generating messaging campaigns targeted to or customized for a specific user, using user data from a plurality of data sources 120. The data sources 120 can be any digital source with information concerning an individual user's interactions, including, but are not limited to, social platforms, shopping history, web browsing activities, interactions with digital devices, interactions with other users, etc. The content from the data sources 120 pushes component 103 of the segment of one engine 101 to send messaging campaign information to a cognitive system 110 for data processing and message generation. The cognitive system 110 includes a message poller 111, which sends periodic requests to the plurality of data sources 120 for data on the specific user. The collected data are stored in a metadata store 114. Upon receipt of the specific user data, a multi-level message alignment component 112 processes the data and calculates a linguistics preference set for the specific user using cognitive models, as described further below. The linguistics preference set of the specific user is passed to a channel selector and message generator 113. The channel selector and message generator 113 selects a messaging channel for the specific user and generates the customized message for the specific user according to the linguistics preference set, where the customized message incorporates linguistic traits based on the linguistics preference set. The customized message is then sent only to the specific user over the selected messaging channel, as described further below.

Figure 2:
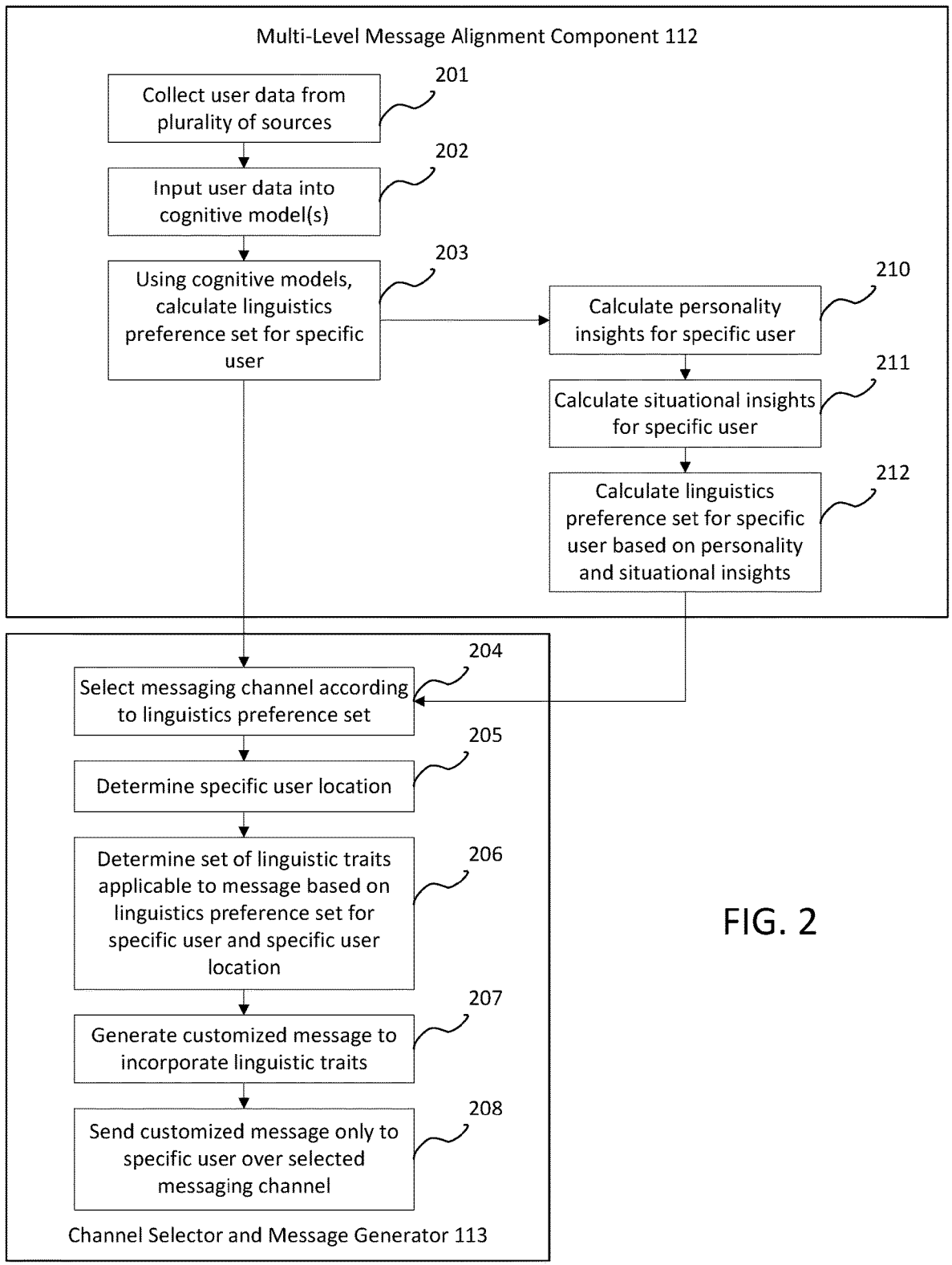
FIG. 2 illustrates a method for multi-level linguistic alignment in specific user targeted messaging, according to some embodiments.
Figure 6:
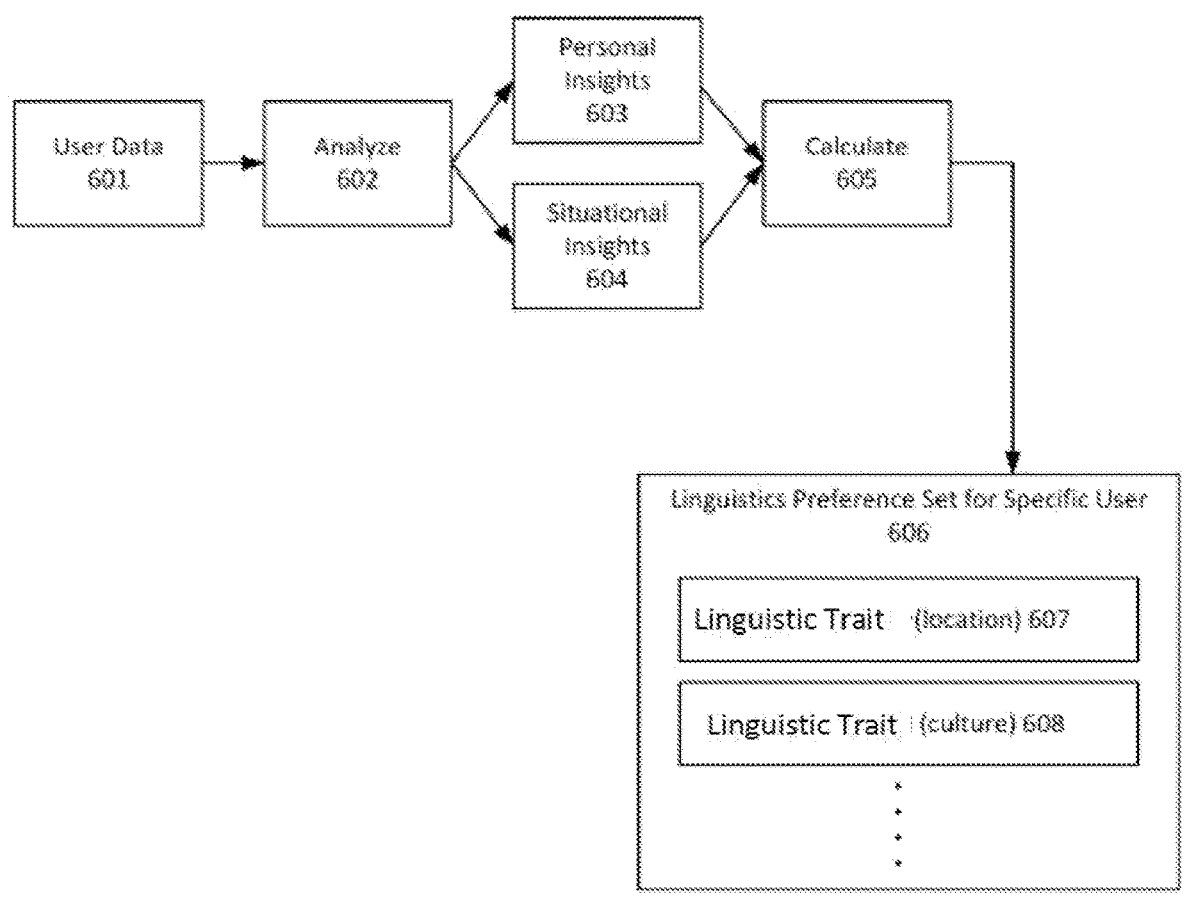
FIG. 6 illustrates the generating of a linguistic preference set for a specific user, according to embodiments of the present invention.

FIG. 2 illustrates a method for multi-level linguistic alignment in specific user targeted messaging, according to some embodiments. The multi-level message alignment component 112 collects user data of a specific user from the plurality of sources (201) and inputs the user data into one or more cognitive models (202). Using the cognitive models, the multi-level message alignment component 112 calculates a linguistics preference set for the specific user (203). FIG. 6 illustrates the generating of a linguistic preference set for a specific user, according to embodiments of the present invention. Referring to both FIGS. 2 and 6, in calculating the linguistics preference set, the multi-level message alignment component 112 uses cognitive models with the user data 601 as input. The cognitive models analyze 602 the user data 601 and output or calculate personality insights 603 for the specific user (210). The personality insights represent expectations, motives, goals, beliefs, and other personality traits of the specific user that are inferred from the specific user data. The multi-level message alignment component 112 further calculates situational insights 604 for the specific user using cognitive models (211). The situational insights represent the events, actions, and other behavior of the specific user that are inferred from the specific user data. A linguistics preference set for the specific user is then calculated 605 using the cognitive models with the personality insights 603 and the situation insights 604 as parameters (212). The linguistics preference set include one or more sets of linguistic traits 607-608 preferred by the specific user. The linguistics preference set represent the relationships, inferred using the cognitive models, between different sets of linguistic traits preferred by the specific user and the personality and situational insights. Linguistic traits include the language, dialect, slang terms, syntax and spelling variations, and other such traits associated with particular geographic areas or particular cultures. The geographic area in which the specific user is currently or historically located and/or the culture associated with the specific user is inferred from the user data and reflected in the linguistics preference set for the specific user. The geographic areas can include, but are not limited to, areas in which the user frequents, such as the user's workplace, user's home, a sports arena, or a shopping establishment. The geographic areas may also include areas with which the user has a level of familiarity or a history, such as a home town. For example, the specific user may prefer one language when at work and a second language when not at work. Within the same language, different slangs may apply in different geographical areas that the user frequents. Further, the personality traits of the specific user may indicate patterns of linguistic preferences depending on the topic of the message. The linguistics preference set is thus a multi-leveled set of linguistics preferences that is unique to the specific user. The linguistics preference set for the specific user can then be used to generate a highly customized message that is aligned with the specific user, as described further below.

Referring again to FIG. 2, the channel selector and message generator 113 selects a messaging channel according to the linguistics preference set for the specific user (204). A preference for certain messaging channels may be inferred from the user data for the specific user and captured by the linguistics preference set. For example, the specific user may prefer certain messaging channels depending on, but not limited to, the user's location, the send time for the message, or the context of the message. The channel selector and message generator 113 determines a location of the specific user (205). The location can be a current location of the specific user, obtained through a location service on the user device 130, such as coordinates from a global positioning system (GPS) on the user device 130. The location can also be a predicated location of where the specific user is expected to be, based on patterns and trends identified through the analysis of the specific user data. The predicted location can be determined based on the context of the message. For example, the context of the message can be related to personal entertainment, and in response, and the personality and situation insights of the specific user indicates that the specific user prefers messages concerning personal entertainment to be received outside of working hours. A location where the specific user is predicted to be when outside working hours can be selected as the user location. The channel selector and message generator 113 determines a set of linguistic traits applicable to the message based on the linguistics preference set for the specific user and the specific user location (206). Depending on the specific user's current location or predicted location, different languages, slang terms, or other linguistic traits may be preferred by the specific user, as captured by the linguistics preference set for the specific user. The channel selector and message generator 113 generates a customized message to incorporate the linguistic traits (207). The channel selector and message generator 113 sends the customized message only to the specific user via a user device 130 over the selected messaging channel (208).

Figure 3:
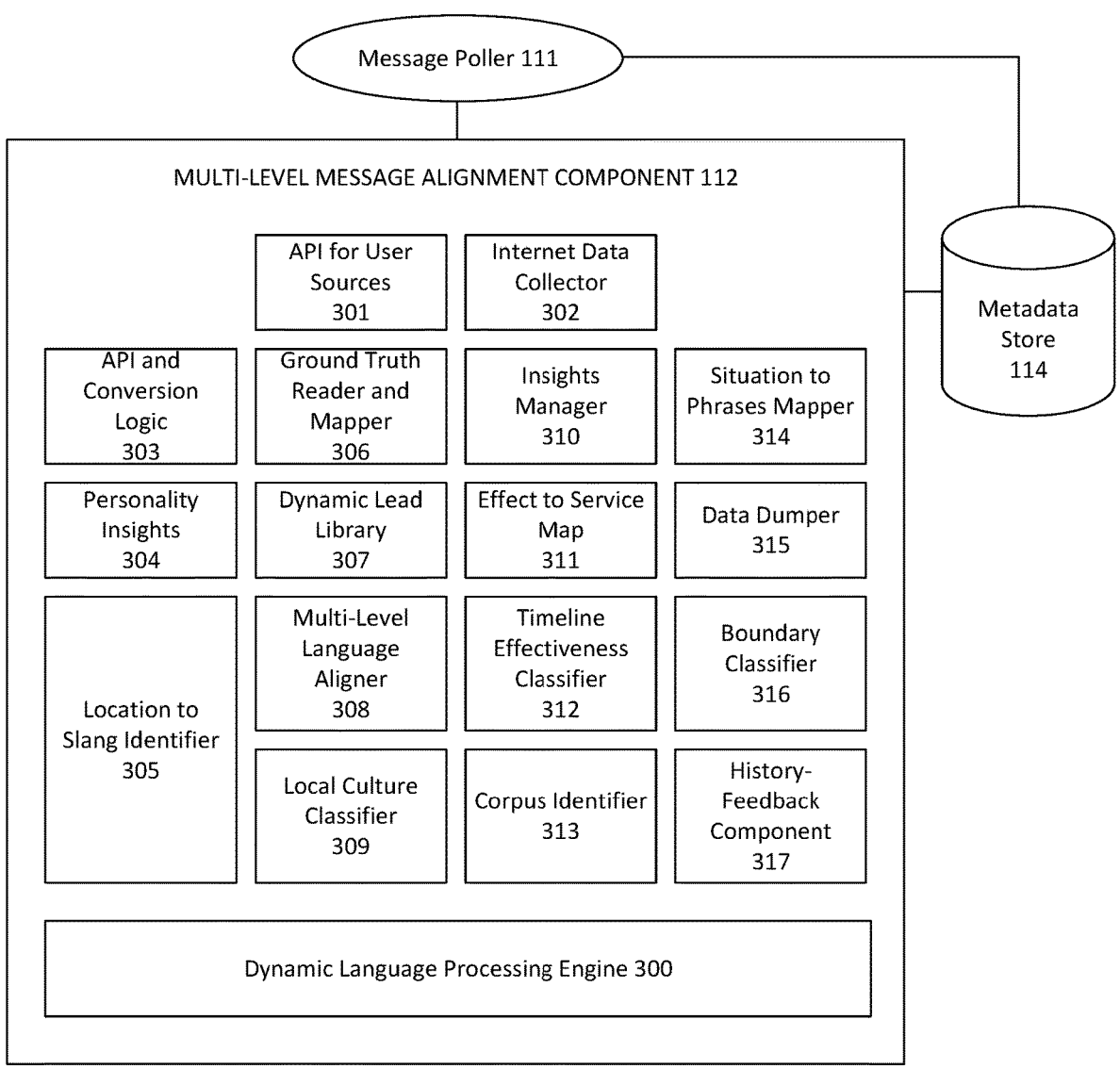
FIG. 3 illustrates in more detail the multi-level message alignment component 112, according to some embodiments.

FIG. 3 illustrates in more detail the multi-level message alignment component 112, according to some embodiments. The multi-level message alignment component 112 includes a dynamic language processing engine 300 which processes specific user data using cognitive models to calculate the personality insights, situational insights, and linguistics preference set for the specific user. The multi-level message alignment component 112 includes an application programming interface (API) 301 for connecting to the plurality of data sources 120 and collecting user data for the specific user. The Internet data collector 302 includes interfaces to connect to the Internet to obtain static and dynamic information on the specific user. The API and conversation logic 303 maps the specific user data to the ground truth using the ground truth reader and mapper 306. The ground truth reader and mapper 306 performs "ground truthing", which refers to the use of statistical models, machine learning models, or other cognitive models to calculate the truthfulness of the collected data. The insights manager 310 analyzes the specific user data and infers situational insights for the specific user, using at least the situation to phrases mapper 314, which maps phrases that may be found in the user data to situations. The specific user data is analyzed to identify patterns and trends, and the patterns and trends are used to infer the situational insights. The personality insights component 304 analyzes the specific user data to calculate the personality insights for the specific user. The patterns and trends identified in the specific user data are used to infer the personality traits for the specific user. The dynamic lead library 307 includes a collection of information about changes in the specific user's situations, such as differences between a meeting at work or a get together with friends. In some embodiments, the dynamic lead library 307 includes a linguistic and location preference history associated with the different specific user situations. The effect to service map 311 manages service subscriptions. In some embodiments, the multi-level message alignment is implemented as a cloud service. The effect to service map 311 identifies which client services are subscribed to the multi-level message alignment service and perform collection/response handling with these client service using map based approaches. The data dumper 315 generates objects that can be stored and retrieved from the metadata store 114. The location to slang identifier 305 identifies the language variations or slang between geographic areas and the corresponding language corpus. The multi-level language alignment component 112 identifies correlations between the geographic area-based slang information, the specific user situational insights, the specific user personality insights, and other information calculated by various components of the multi-level message alignment component 112. The timeliness effectiveness classifier 312 classifies levels of effectiveness of messages to the specific user based on the time the message was sent. The boundary classifier 316 identifies the geographic areas according to shared linguistic traits. The local culture classifier 309 classifies cultural traits for particular geographic areas. The boundary classifier 316 and the local culture classifier 309 are used by the location to slang identifier 305 to identify the slang corpus consistent with the linguistic and cultural traits of a geographic area. The corpus identifier 313 identifies the natural language corpus/corpora associated with the linguistic and/or cultural traits. The history-feedback component 317 stores the history of calculations by the multi-level message alignment component 112 and obtains feedback concerning the effectiveness and/or accuracy of the results. The history and feedback are then input into the cognitive models of the multi-level message alignment component 112 to improve their accuracy. The user-based dynamic language processing engine 300 collects the information output by the cognitive models and passes the information to the channel selector and message generator 113.

Figure 4:
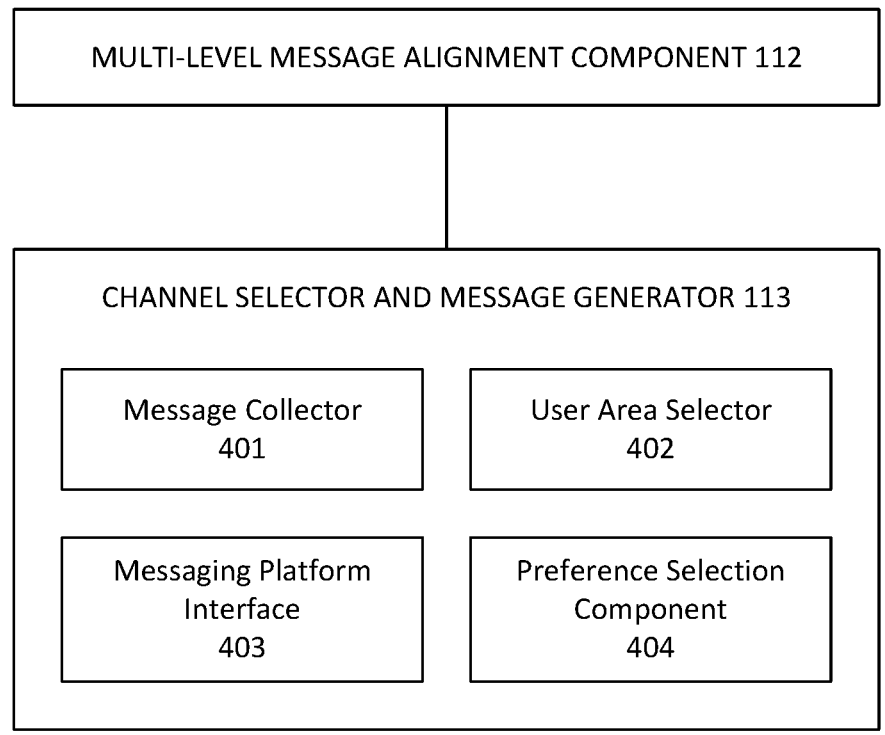
FIG. 4 illustrates components of the channel selector and message generator 113, according to some embodiments.

FIG. 4 illustrates components of the channel selector and message generator 113, according to some embodiments. The channel selector and message generator 113 includes a message collector 401, which receives the linguistics preference set for the specific user from the user-based dynamic language processing engine 300. The user area selector 402 determines the specific user's current or predicted location. The preference selection component 404 selects the preference from the linguistics preference set for the specific user's current ore predicted location. In some embodiment, the preference is selected based on other factors as well, such as the message context and the selected messaging channel. The message is then generated according to the selected preference. Via the messaging platform interface 403, the customized message is sent only to the specific user via the user device 130 over the selected message channel.

For example, assume that the multi-level message alignment component 112 determines, based on analysis of data for a first specific user, that the first specific user prefers messages with a context related to medical services to be received during working hours, be in a first language, and through a telephone call. The multi-level message alignment component 112 further determines the first specific user's location during hours, identifies the area or boundary in which this location resides, and identifies the language and slang corpora associated with the area and/or culture of the area. The channel selector and message generator 113 selects the appropriate telephone network, generates an audio message in the first language, and incorporates slang terms associated with the area. A telephone call is then initiated to the first specific user during the first specific user's working hours.

For another example, assume that the multi-level message alignment component 112 determines, based on analysis of data for a second specific user, that the second specific user prefers messages with a context related to food recipes to be received in a second language, as an email, and while the second specific user is at home. The multi-level message alignment component 112 further determines the location of the second specific user's home, identifies the area in which the home resides, and identifies the language and slang corpora associated with the area and/or culture of the area. The channel selector and message generator 113 selects the appropriate email messaging channel, and generates an email in the second language, and incorporates slang terms associated with the area. The email is sent to the second specific user during times in which the second specific user is likely to be at home.

For a third example, assume that the multi-level message alignment component 112 determines, based on analysis of data for a third specific user, that the third specific user prefers messages with a context related to sports to be in a third language, as a text message, and while outside of working hours. The multi-level message alignment component 112 further determines the locations frequented by the third specific user outside of the third specific user's working hours, identifies the areas in which the frequently locations resides, and identifies the language and slang corpora associated with the areas and/or cultures of the areas. The channel selector and message generator 113 selects the appropriate text messaging channel, generates a text message in the third language, and incorporates slang terms associated with the area. The text message is sent to the third specific user outside of working hours.

Figure 5:
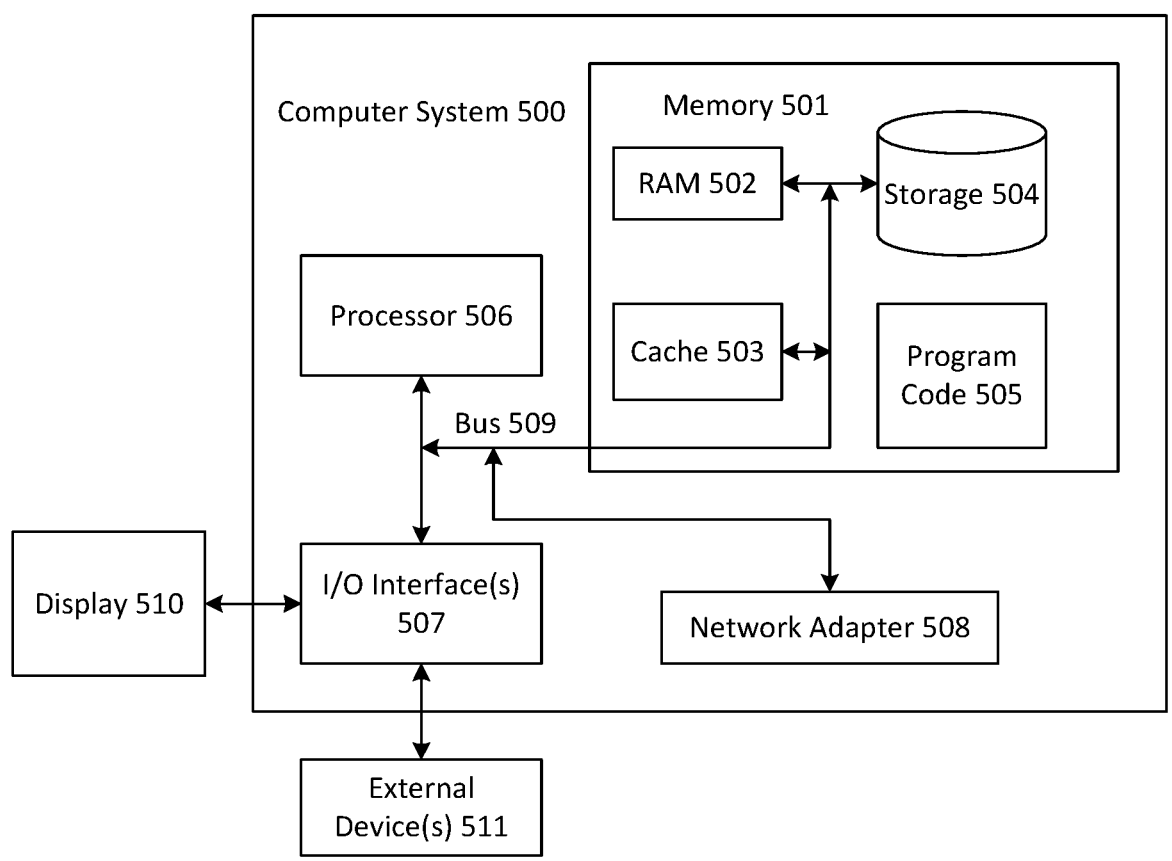
FIG. 5 illustrates a computer system, one or more of which implements the multi-level linguistic alignment in targeted individual user messaging, according to embodiments of the present invention.

FIG. 5 illustrates a computer system, one or more of which implements the multi-level linguistic alignment in targeted individual user messaging, according to embodiments of the present invention. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 508.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for user specific targeted messaging used by an individual user to manage individual specific personal user needs comprising:

analyzing, by a computer system, collected data from a plurality of sources relating to a specific user; wherein said specific user is a single individual user;

providing said analyzed data as an input to a cognitive model for determining said specific user's personality insights, situational insights and a preference linguistic set; wherein said personality insight includes at least one of said specific user's expectations, motives, goals and beliefs;

said cognitive model calculating a relationship between said specific user's personality insights and situational insights and preference linguistic to use in interactions with said specific user in one or more generated message;

said cognitive model generating a multilayered linguistic preference set for said specific user;

upon receiving a communication from said specific user, determining said specific user's current location and a particular messaging channel to be used based on said specific user's current location;

determining, a set of linguistic traits applicable to said linguistic preference set for said specific user wherein said linguistic traits can provide a same message in different format and languages by analyzing context of each message, said specific user's current location, language preferences based on a language hierarchy for said specific user based on previously collected data as well as and specific user input;

generating a customized message based on using said cognitive model's determination of said specific user personality insights, situational insights and said set of language hierarchical linguistic preference set, a message to said specific user and based on said specific user's current location, messaging channel; and sending said customized message only to said specific user.

2. The method of claim 1, wherein said cognitive model infers personality and situational insights from patterns and trends obtained from specific user data input.

3. The method of claim 1, wherein said collected data includes data recently collected, and data previously collected and stored in a location and the location of the user comprises predicted location of the specific user selected according to a context of the customized message.

4. The method of claim 3, wherein said other data previously collected includes data previously stored.

5. The method of claim 1, wherein the set of linguistic traits comprise at least a language and slang terms associated with the location of the specific user, wherein the determining of the set of linguistic traits applicable to the customized message comprises:

identifying, by the computer system, a language and slang corpora associated with the location of the specific user.

6. The method of claim 5, wherein the generating of the customized message comprises:

generating by the computer system the customized message in the language and incorporating slang terms.

7. The method of claim 1, further comprising:

selecting, by the computer system, said messaging channel according to the linguistics preference set; and sending, by the computer system, the customized message only to the specific user over the selected messaging channel.

8. The method of claim 1, wherein said data collected about said specific user is stored.

9. The method of claim 1, wherein other data previously collected includes data kept specifically relating to said specific user in a storage.

10. The method of claim 1, wherein said plurality of data sources include social platform, shopping history, web browser activity, interaction with other user(s) and/or interaction with other user devices.

11. A computer program product for linguistic alignment in user specific targeted messaging used by an individual user to manage individual specific personal user needs, the computer program product comprising a computer readable storage medium having program instructions embodied therewith, the program instructions executable to processor to cause the processor to:

analyze collected data from a plurality of sources relating to a specific user, wherein said specific user is a single individual user;

provide said analyzed data as an input to a cognitive model for determining said specific user's personality insights, situational insights and a preference linguistic set; wherein said personality insight includes at least one of said specific user's expectations, motives and goals and beliefs;

said cognitive model calculate a relationship between said specific user's personality insights and situational insights and preference linguistic to be used for interactions with said specific user in one or more generated message;

said cognitive model to generate a multilayered linguistic preference set for said specific user;

upon receiving communication from said specific user, determine said user's current location and a particular messaging channel to be used based on said user's current location;

determine a set of linguistic traits applicable to said linguistic preference set for said specific user wherein said linguistic traits can provide a same message in different format and languages by analyzing context of each message, said specific user's current location, language preferences based on a language hierarchy for said user based on previously collected data as well as and specific user input;

generate a customized message based on said cognitive model's determination of said specific user personality insights, situational insights and said set of language hierarchical linguistic preference set, a message to said specific user and based on said user's current location and messaging channel messaging channel; and send said customized message only to said specific user.

12. The computer program product of claim 11, wherein said cognitive model infers personality and situational insights from patterns and trends obtained from specific user data input.

13. The computer program product of claim 11, further comprising select said messaging channel according to said linguistic preference set and send the customized message only to the specific user over the selected messaging channel; wherein the location of the user comprises predicted location of the specific user selected according to a context of the customized message.

14. The computer program product of claim 11, wherein the set of linguistic traits comprise at least a language and slang terms associated with the location of the specific user, wherein the determining of the set of linguistic traits applicable to the customized message, the processor is further cause to:

identify a language and slang corpora associated with the location of the specific user.

15. The computer program product of claim 14, wherein in the generating of the customized message, the processor is further cause to:

generate by the computer system the customized message in the language and incorporating slang terms.

16. A system comprising:

a processor, a computer readable storage medium having program instructions embodied therewith, the program instructions executable by a processor to cause the processor to:

analyze collected data from a plurality of sources relating to a specific user; wherein said specific user is a single individual user;

provide said analyzed data as an input to a cognitive model for determining said specific user's personality insights, situational insights and a preference linguistic set wherein said personality insight includes at least one of said specific user's expectations, motives and goals and beliefs;

said cognitive model calculate a relationship between said specific user's personality insights and situational insights and preference linguistic to be used for interactions with said specific user in one or more generated message;

said cognitive model generating a multilayered linguistic preference set for said specific user;

upon receiving a communication from said specific user, determine said specific user's current location and a particular messaging channel to be used based on said specific user's current location;

determine a set of linguistic traits applicable to said linguistic preference set for said specific user wherein said linguistic traits can provide a same message in different format and languages by analyzing context of each message, said specific user's current location, language preferences based on a language hierarchy for said specific user based on previously collected data as well as and specific user input;

generate a customized message based on using said cognitive model's determination of said specific user personality insights, situational insights and said set of language hierarchical linguistic preference set, a message to said specific user and based on said specific user's current location, and messaging channel; and sending said customized message only to said specific user.

17. The system of claim 16, wherein said cognitive model infers personality and situational insights from patterns and trends obtained from specific user data input.

18. The system of claim 16, further comprising sending the customized message only to the specific user over the selected messaging channel and wherein the location of the user comprises predicted location of the specific user selected according to a context of the customized message.

19. The system of claim 16, wherein the set of linguistic preferences comprise one or more sets of linguistic traits and at least a language and slang terms associated with the location of the specific user, wherein the determining of the set of linguistic traits applicable to the customized message, the processor is further cause to:
 identify a language and slang corpora associated with the location of the specific user.

20. The system of claim 19, further comprising select said messaging channel according to said linguistics preference set;
 generate by the computer system the customized message in the language and incorporating slang terms.

* * * * *